(12) United States Patent  
Miyashita et al.

(10) Patent No.: US 7,330,175 B2  
(45) Date of Patent: Feb. 12, 2008

(54) INFORMATION PROCESSING APPARATUS

(75) Inventors: Hisaya Miyashita, Kanagawa (JP); Naohiko Otake, Chiba (JP); Hiroki Tamai, Kanagawa (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 10/775,155

(22) Filed: Feb. 11, 2004

(65) Prior Publication Data

US 2004/0164955 A1    Aug. 26, 2004

(30) Foreign Application Priority Data

Feb. 13, 2003    (JP)    ............................. 2003-035341

(51) Int. Cl.
*G09G 5/00* (2006.01)
(52) U.S. Cl. ........................ 345/156; 345/163; 345/168
(58) Field of Classification Search ................ 345/156, 345/163, 168, 169; 361/679–681, 683, 686
See application file for complete search history.

(56) References Cited

U.S. PATENT DOCUMENTS 6,081,207 A * 6/2000 Batio .......................... 341/20
6,909,597 B2 * 6/2005 Tutikawa ..................... 361/681
6,930,881 B2 * 8/2005 Karidis et al. ............... 361/683
6,977,811 B1 * 12/2005 Fleck et al. .................. 361/686
2002/0093328 A1 * 7/2002 Maatta et al. ............. 324/207.11

FOREIGN PATENT DOCUMENTS

JP        08-076916    *    3/1996
JP        2001-134379       5/2001

* cited by examiner

*Primary Examiner*—Ricardo Osorio
(74) *Attorney, Agent, or Firm*—Oblon, Spivak, McClelland, Maier & Neustadt, P.C.

(57) ABSTRACT

In an information processing apparatus, a display unit is pivotally supported on a main unit by a hinge having a hinge pin. Left and right buttons serving as first and second function buttons for controlling an object chosen by a pointer appearing on a display, and a third function button for scrolling the screen displayed on the display are provided near one end in the axial direction of the hinge pin between the display unit and a keyboard.

5 Claims, 15 Drawing Sheets

INFORMATION PROCESSING APPARATUS

BACKGROUND OF THE INVENTION

1. Field of the Invention

The present invention relates to information processing apparatuses, and more particularly, to a technical field for increasing the usability of an information processing apparatus in which a display unit having a display is pivotally supported on a main unit having a keyboard by a hinge.

2. Description of the Related Art

Information processing apparatus are known in which a display unit having a display is supported on a main unit having a keyboard with cursor keys, character entry keys, and so on by a hinge so that it can pivot to open and close the keyboard. Such information processing apparatuses include, for example, personal computers and PDAs (personal digital assistants). Some of the information processing apparatuses are provided with a pointing device that serves to move a pointer appearing on the display in a required direction.

Pointing devices include a stick-shaped device in which a force in a required direction is applied to a rodlike projection with the finger to move the pointer, a pad-shaped device, called a control pad, in which a surface thereof is traced with the finger to move the pointer in a required direction, a left button for carrying out a menu item chosen by the pointer, and a right button for displaying a submenu (popup menu) at the pointer. In general, these pointing devices are frequently used because they can serve various functions by simple operation.

In such information processing apparatuses, the display screen displayed on the display is scrolled by first selecting a scroll bar displayed at one end of the display, for example, at the right end or the lower end, with a pointer through the operation of a pointing device or the like, and then moving the pointer on the scroll bar in the vertical direction (up-down direction) or in the horizontal direction (right-left direction).

For example, Japanese Unexamined Patent Application Publication No. 2001-255978 discloses an information processing apparatus in which the display screen can be scrolled in both the vertical direction and the horizontal direction with a single common scroll bar.

With recent popularization of information processing apparatuses, information processing apparatuses have been developed which are used on the desk, and which are also used as highly portable apparatuses that can be easily operated while being gripped in the hands.

However, the known information processing apparatuses often cannot be easily operated as portable apparatuses because the pointing device is disposed at the front side of the main unit. When an information processing apparatus is used as a portable apparatus, it is desirable that the user grips both right and left sides of the main unit on the side of the hinge adjacent to the center of gravity of the apparatus, in order to maintain a stable gripping state. However, when operating the pointing device, the user must grip the portion of the main unit close to the center of gravity with only one hand, and the gripping state becomes unstable. Moreover, the hand must be moved, and operability is low. Since the pointing device is frequently used, as described above, the above problems are particularly significant when the information processing apparatus is used as a portable apparatus.

The pointing devices also include a center button that allows the above-described scrolling operation. Since the center button is frequently used in succession to the left button and the right button, if it is disposed apart from the left button and the right button, the user must move the hand to successively use the buttons, and operability is reduced.

SUMMARY OF THE INVENTION

The present invention has been made to overcome the above problems, and an object of the present invention is to enhance the usability of an information processing apparatus that is also used as a portable apparatus.

In order to achieve the above object, according to one aspect, the present invention provides an information processing apparatus including a display unit equipped with a display, a main unit equipped with a keyboard having a plurality of operation keys, and a support unit that supports the display unit on the main unit so that the display unit pivots on a hinge having a hinge pin to open and close the keyboard, wherein a first function button and a second function button that control an object chosen by a pointer appearing on the display, and a third function button that allows a screen displayed on the display to be scrolled are provided near one end in the axial direction of the hinge pin between the display unit and the keyboard.

Therefore, when the information processing apparatus is used as a portable apparatus, the user can operate the first function button, the second function button, and the third function button with one hand that is also gripping the main unit. This enhances the usability of the information processing apparatus.

In particular, since the first function button, the second function button, and the third function button are frequently used, and are often used in succession, when they are disposed adjacent to one another, different operations can be performed without moving the hand, and ease of operation is enhanced.

Preferably, the first function button and the second function button are arranged around the circumference of the third function button.

In this case, the layout space is effectively used, and the size of the information processing apparatus can be reduced.

Preferably, the information processing apparatus further includes a pointing device for moving the pointer appearing on the display in a required direction, and the pointing device is disposed at the other end of the hinge pin between the display unit and the keyboard.

In this case, when the information processing apparatus is used as a portable apparatus, the first function button, the second function button, and the third function button can be operated with one hand that is also gripping the apparatus, and the pointing device can be operated with the other hand that is also gripping the apparatus. Consequently, usability is enhanced.

Preferably, the information processing apparatus further includes a plurality of cursor keys for moving a cursor appearing on the display in predetermined directions, and the cursor keys are disposed at the other end of the hinge pin between the display unit and the keyboard.

In this case, when the information processing apparatus is used as a portable apparatus, the first function button, the second function button, and the third function button can be operated with one hand that is also gripping the apparatus, and the cursor keys can be operated with the other hand that is also gripping the apparatus. Consequently, usability is enhanced.

According to another aspect, the present invention provides a control method for an information processing apparatus, wherein a first function button, a second function button, and a third function button are disposed near one end in the axial direction of a hinge pin between a display unit and a keyboard in the information processing apparatus, the second function button and the third function button are arranged around the circumference of the first function button, and the first function button allows a screen displayed on the display unit to be scrolled, and the second function button controls an object chosen by a pointer appearing on the display unit.

Further objects, features and advantages of the present invention will become apparent from the following description of the preferred embodiments (with reference to the attached drawings).

DESCRIPTION OF THE PREFERRED EMBODIMENTS

An embodiment of the present invention will be described below with reference to the attached drawings. In the following embodiment, the present invention is applied to an information processing apparatus (personal computer) that also can be used as a portable apparatus.

Figure 1:
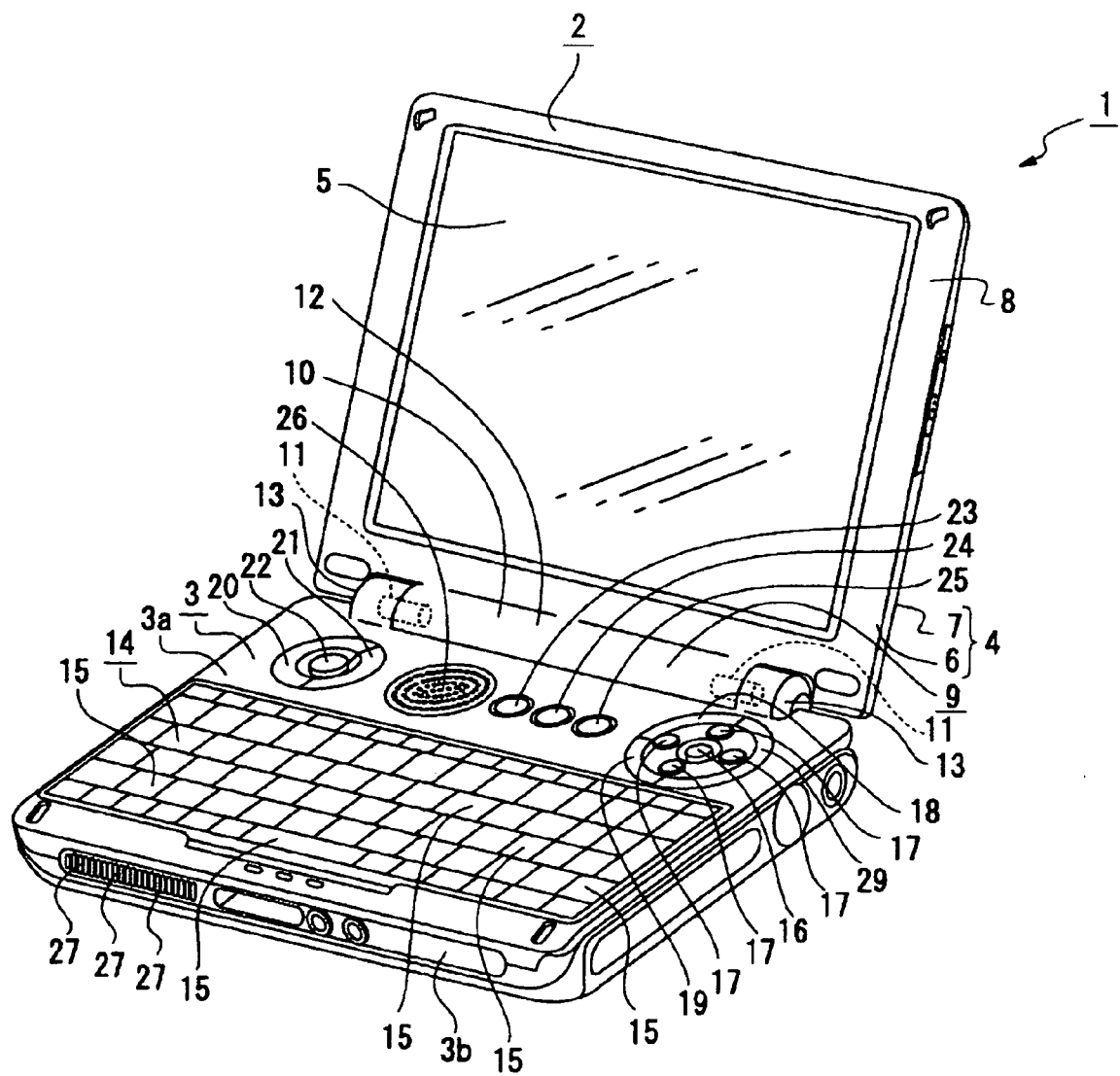
FIG. 1 is a perspective view of an information processing apparatus in a state in which a display unit is open, according to an embodiment of the present invention.
Figure 2:
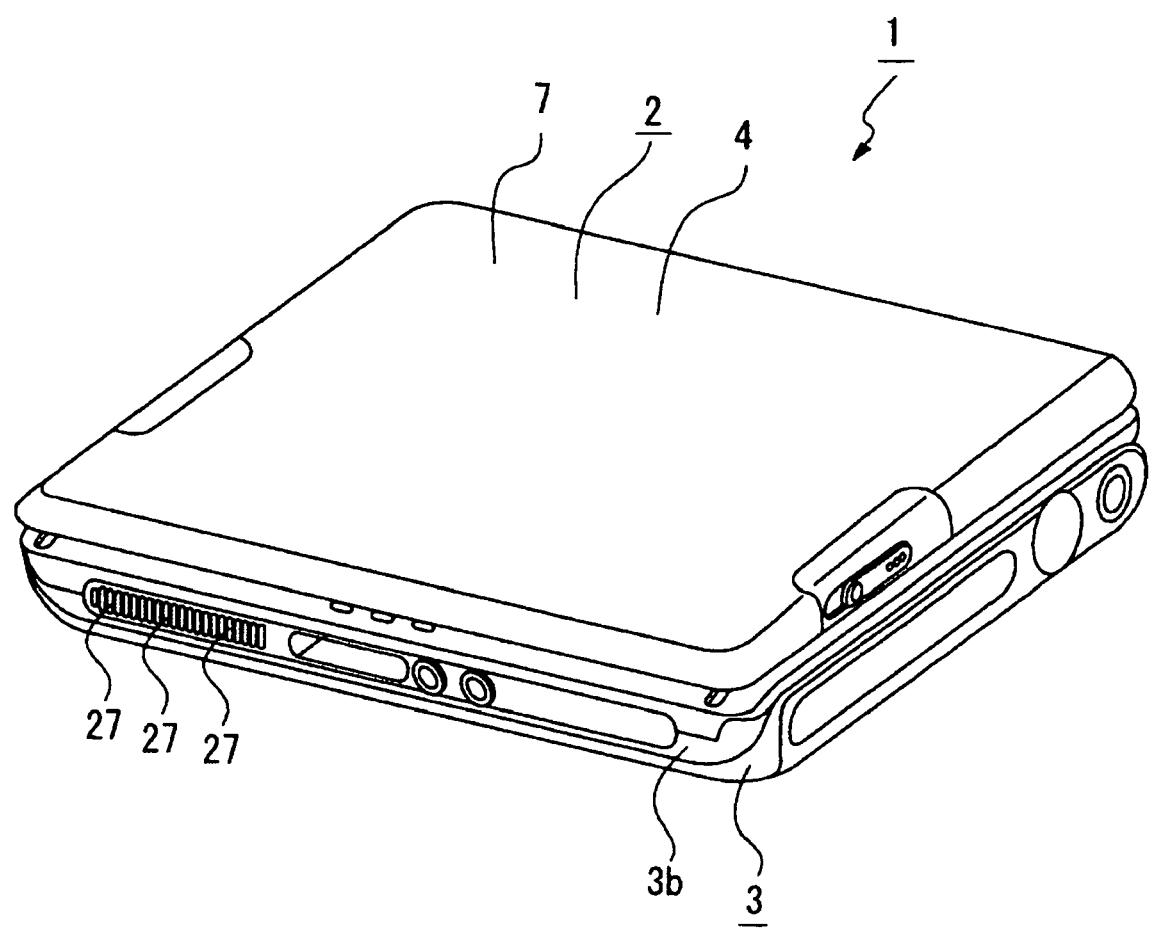
FIG. 2 is a perspective view of the information processing apparatus in a state in which the display unit is closed.
Figure 3:
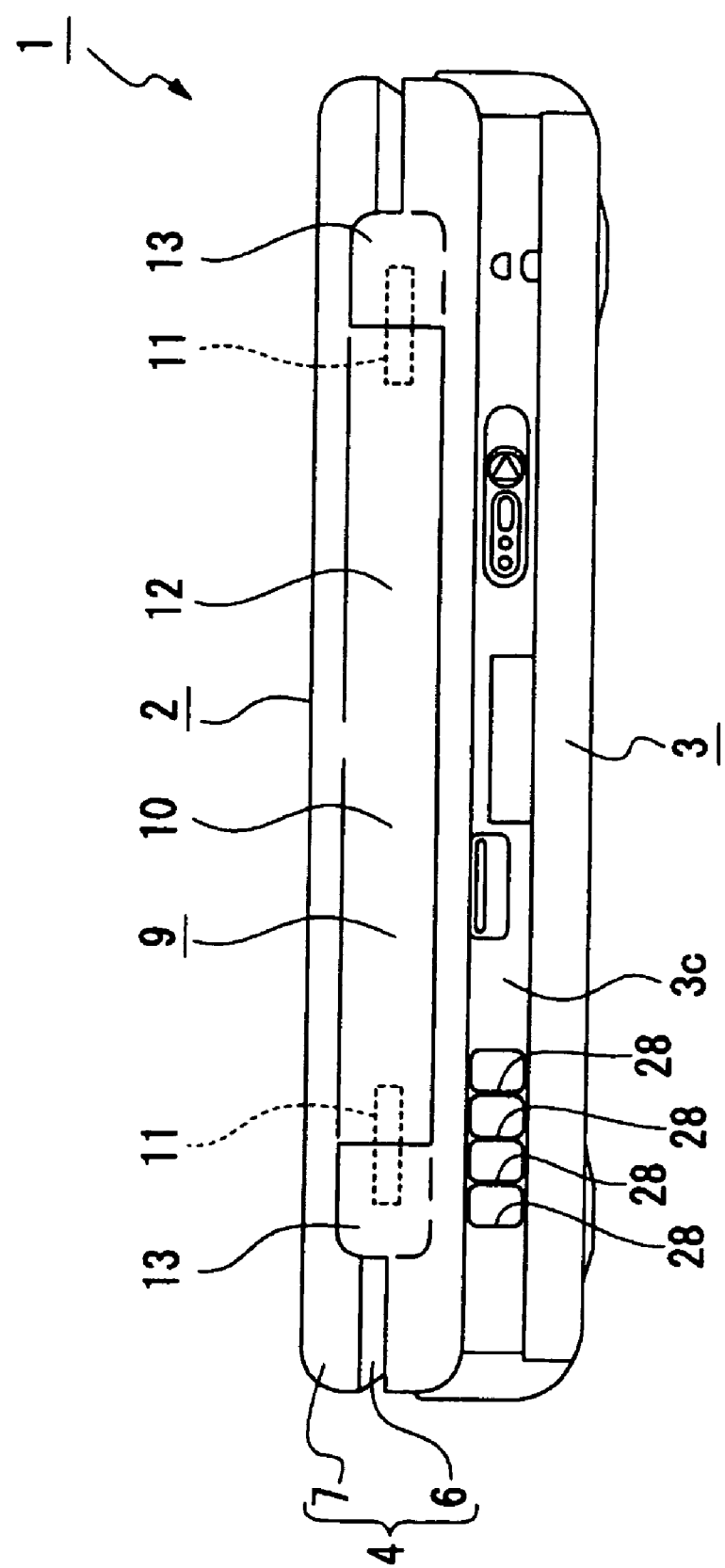
FIG. 3 is a rear view of the information processing apparatus in a state in which the display unit is closed.

Referring to FIGS. 1 to 3, an information processing apparatus 1 of this embodiment includes a display unit 2 and a main unit 3.

The display unit 2 includes a display housing 4, and a display 5 disposed in the display housing 4.

The display housing 4 is a combination of a frame-shaped front panel 6 having a substantially rectangular outline, and a thin box-shaped rear panel 7 having a substantially rectangular outline and opened on the side of the front panel 6. An outer peripheral portion of the display housing 4 serves as a frame 8.

The display unit 2 is pivotally supported at the rear end of the main unit 3 by a hinge 9 extending in the right-left direction. In a non-operation state, the display unit 2 is pivoted to a closed position such as to close a keyboard of the main unit 3 which will be described, as shown in FIG. 2.

The hinge 9 includes a hinge barrel 10, and hinge pins 11 disposed inside the hinge barrel 10, as shown in FIGS. 1 and 3. The hinge barrel 10 includes a display-side hinge barrel 12 and body-side hinge barrels 13.

The display-side hinge barrel 12 is formed integrally with the display housing 4 to protrude therefrom.

The body-side hinge barrels 13 are formed integrally with an outer housing of the main unit 3 to protrude from the rear edge thereof.

As shown in FIGS. 1 and 3, the hinge pins 11 are disposed between the right and left ends of the display-side hinge barrel 12, and the body-side hinge barrels 13, thereby connecting the display-side hinge barrel 12 and the body-side hinge barrels 13.

Figure 4:
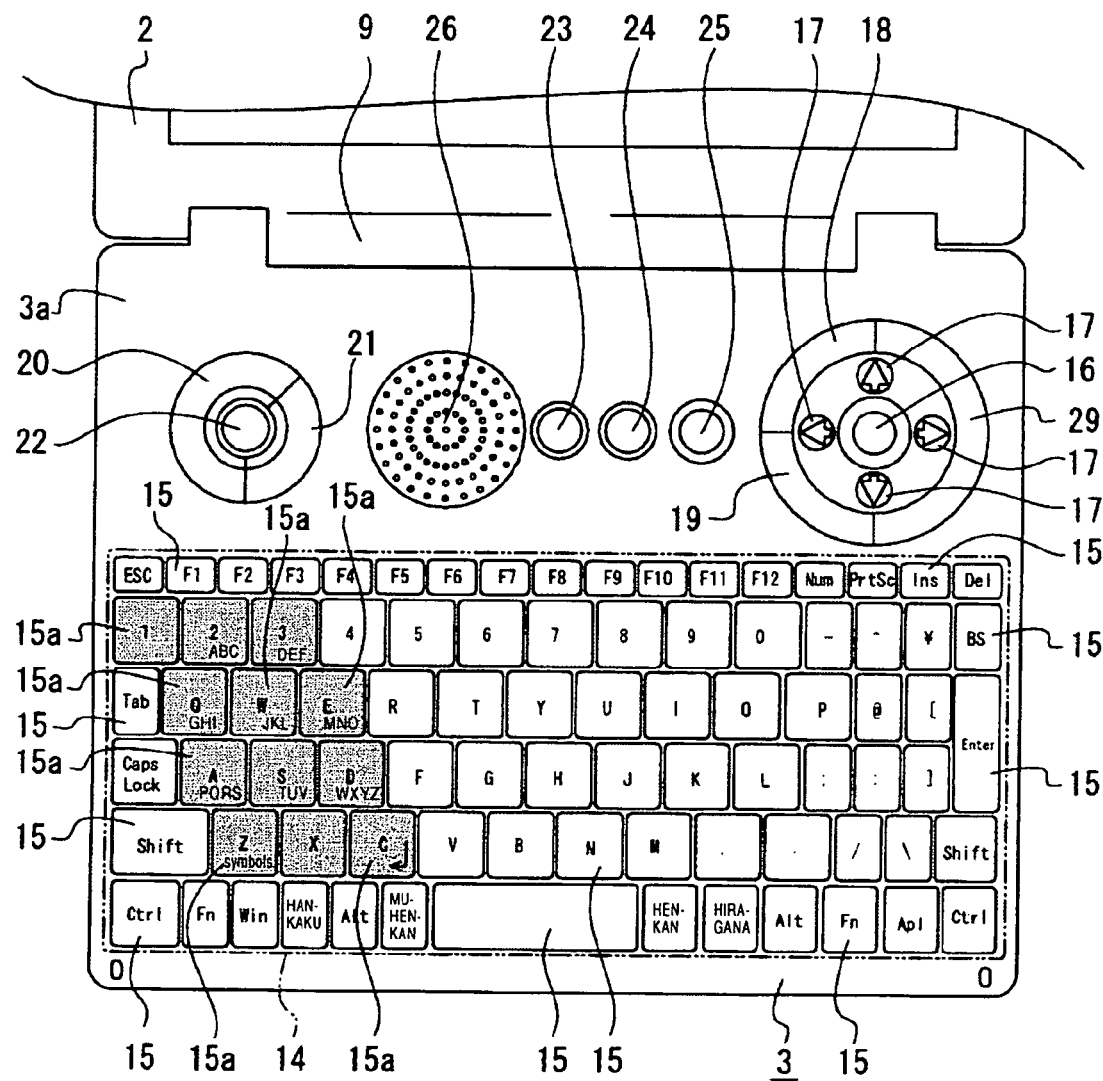
FIG. 4 is a plan view of a main unit of the information processing apparatus.

A keyboard 14 is provided on a portion of an upper surface 3a of the main unit 3 other than the rear end, as shown in FIGS. 1 and 4. The keyboard 14 includes a plurality of predetermined operation keys 15. A processing unit, such as a CPU (central processing unit), is provided inside the main unit 3 to perform processing operations according to signals input by using the operation keys 15 on the keyboard 14.

The operation keys 15 are different types of keys, as shown in FIG. 4.

The backmost row, that is, the first row, includes for example, the escape (Esc) key for returning the software program to the previous step, and function keys F1 to F12 for carrying out predetermined functions.

The second to fifth rows before the backmost row include, for example, input keys for inputting predetermined numbers and characters. The Enter key for confirming the entry extends over the third and fourth rows.

The front row, that is, the sixth row, includes, for example, the Control (Ctrl) key and the Alt key for carrying out predetermined functions in combination with other operation keys 15, the Windows key for displaying a start menu of Windows software, and the Space key for, for example, spacing. The keyboard 14 does not include cursor keys for vertically and horizontally moving a cursor appearing on the display 5.

Some of the operation keys 15 arranged at the left end also serve as auxiliary entry keys 15a (hatched in FIG. 4) for entering characters or the like after an auxiliary entry software program, which will be described later, is started. While the auxiliary entry software program is running, for example, a character "A" can be entered by pressing an auxiliary entry key 15a for ABC once, and a character "a" can be entered by pressing the auxiliary entry key 15a four times.

A pointing device 16 is disposed at the rear right end of the upper surface 3a of the main unit 3. By pressing the pointing device 16 in a required direction with the finger, a pointer appearing on the display 5 can be moved in the direction.

Four cursor keys 17 are equally spaced around the pointing device 16. By operating the cursor keys 17, the cursor appearing on the display 5 can be moved in a predetermined direction, that is, vertically and horizontally.

A switch button 18 and a common button 19 for auxiliary entry, which are arc-shaped, are disposed outside the cursor keys 17. The switch button 18 serves to switch the direction and resolution of the display screen. The common button 19 serves, for example, to start a software program that permits easy character entry (hereinafter, referred to as an "auxiliary entry software program). The common button 19 functions as a start button for starting the program, and as a choice confirmation button for confirming an item chosen from a list or menu displayed on the display 5 in the software program.

In the information processing apparatus 1, the screen displayed on the display 5 can be turned 90° and can be enlarged by operating the switch button 18.

A left button 20, a right button 21, and a center button 22 corresponding to the buttons of a mouse are arranged at the rear left end of the upper surface 3a of the main unit 3. The left button 20 and the right button 21 are arc-shaped, and surround the center button 22. The left and right buttons 20 and 21 are used as first and second function buttons for controlling an object chosen by the pointer appearing on the display 5, and the center button 22 is used as a third function button for scrolling the screen displayed on the display 5.

In the information processing apparatus 1 of this embodiment, the left button 20 is larger than the right button 21. The left button 20 which is more frequently used than the right button 21 is made larger in order to enhance ease of operation.

A power button 23, a standby button 24, and a luminance control button 25 are spaced in the right-left direction on the left side of the switch button 18 and the common button 19 at the rear end of the upper surface 3a of the main unit 3. The power button 23 serves to turn the power on. The standby button 24 serves to switch between a power-saving operation mode and a normal operation mode. The luminance control button 25 serves to control the lighting of a backlight for the display 5. A speaker 26 is provided on the left side of the power button 23.

Air inlets 27 are arranged in the right-left direction at the front end of a front face 3b of the main unit 3, as shown in FIGS. 1 and 2. Air outlets 28 are arranged in the right-left direction at the right end of a rear face 3c of the main unit 3, as shown in FIG. 3.

Therefore, while the information processing apparatus 1 is used, outside air is taken into the main unit 3 through the air inlets 27 to cool the interior of the main unit 3, and air that has been used for cooling is exhausted through the air outlets 28.

Figure 5:
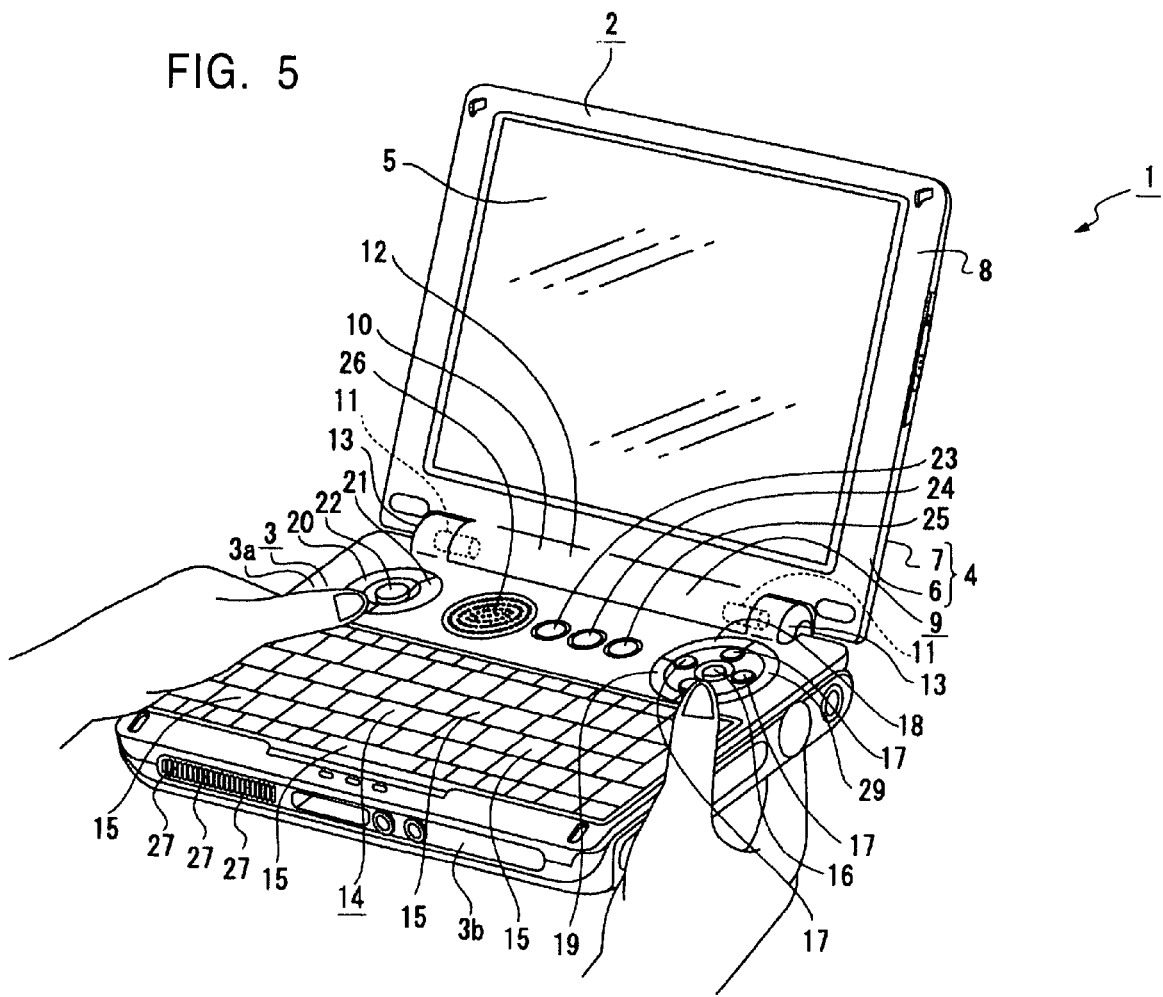
FIG. 5 is a perspective view showing an example in which the information processing apparatus is used as a portable apparatus.
Figure 6:
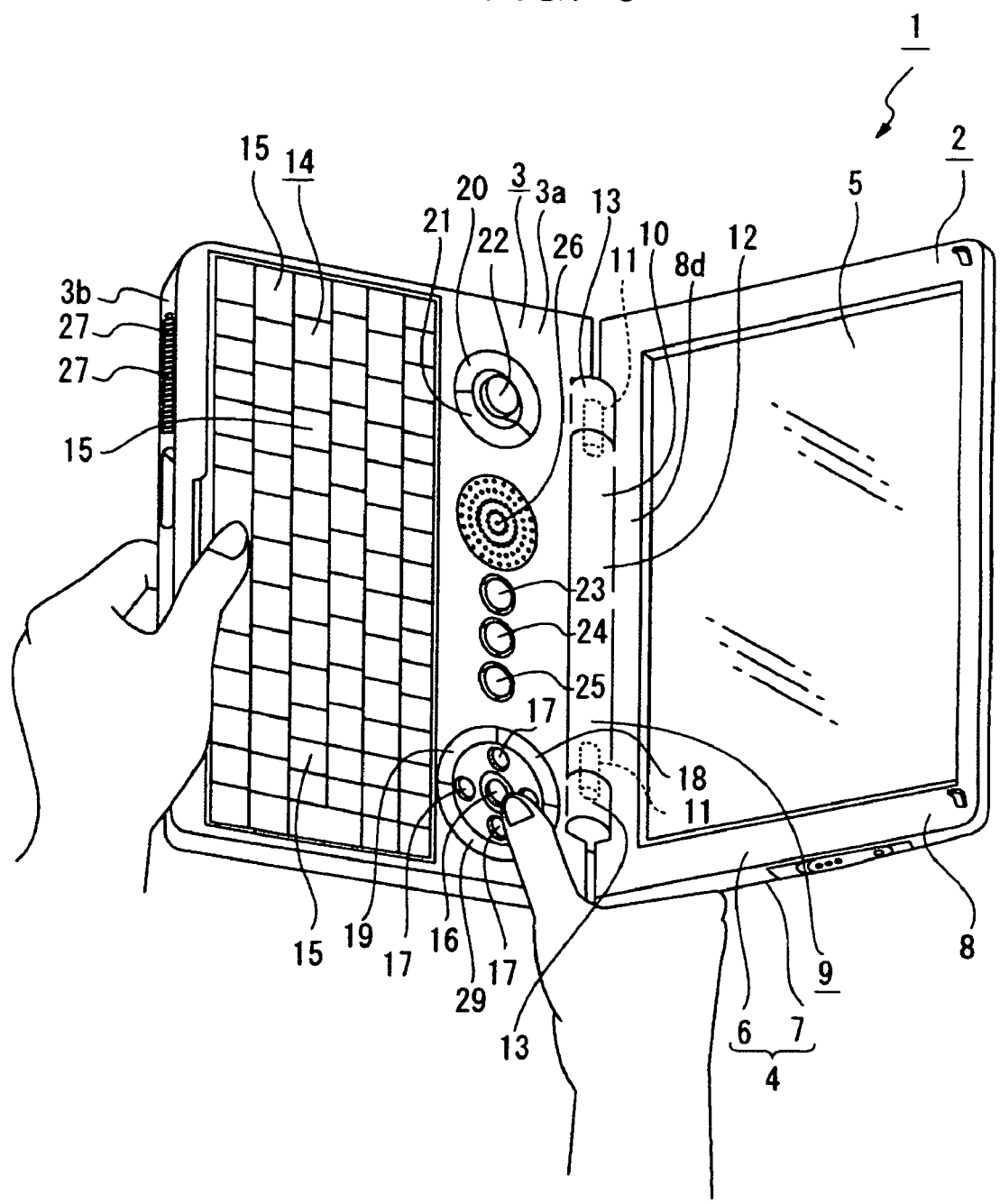
FIG. 6 is a perspective view showing another example in which the information processing apparatus is used.

During use, the display unit 2 is opened to a desired angle with respect to the main unit 3, as shown in FIGS. 1, 5, and 6. This allows the information processing apparatus 1 to be used as a stationary apparatus or a portable apparatus.

In a case in which the information processing apparatus 1 is used as a portable apparatus, for example, the operator operates the information processing apparatus 1 while gripping both right and left sides of the main unit 3 in the hands, as shown in FIG. 5.

Since the display screen can be turned 90° by operating the switch button 18, as described above, for example, when the information processing apparatus 1 is used as a portable apparatus, it can be placed in a sideways position so that the main unit 3 and the display unit 2 are arranged on the right and left sides, as shown in FIG. 6.

Since the air outlets 28 are provided on the rear face 3c of the main unit 3, as described above, air will not be exhausted toward the hands and fingers of the operator, and this enhances the operability of the information processing apparatus 1. Moreover, since the air inlets 27 and the air outlets 28 are provided on the front face 3b and the rear face 3c of the main unit 3, they will not be closed by the hands during use, and a proper cooling function can be achieved. In addition, since the air outlets 28 are not provided on the front face 3b, air will not be exhausted toward the operator. This further enhances the operability of the information processing apparatus 1.

Main functions of the above-described buttons will be described below.

By applying a force in a required direction to the pointing device 16, the pointer appearing on the display 5 can be moved in the required direction, as described above. In this case, the moving speed of the pointer can be adjusted by controlling the force applied to the pointing device 16. By clicking the left button 20 once, for example, a software program or a menu item designated by the pointer can be chosen. By double-clicking the left button 20, a software program or a menu item designated by the pointer can be started (carried out).

By operating the cursor keys 17, the cursor appearing on the display 5 can be moved vertically or horizontally, as described above.

The pointing device 16 and the cursor keys 17 have important functions in operating the information processing apparatus 1, and are frequently used, as described above. Therefore, the pointing device 16 and the cursor keys 17 are frequently operated in succession.

Accordingly, when the pointing device 16 and the cursor keys 17 are disposed adjacent to each other, as in the information processing apparatus 1 of this embodiment, they can be operated without moving the hand. This increases usability.

In particular, in a case in which the information processing apparatus 1 is used as a portable apparatus, as shown in FIGS. 5 and 6, the operator can operate the pointing device 16 and the cursor keys 17 while gripping the main unit 3 with both hands. This increases usability.

Since the cursor keys 17 are provided outside the keyboard 14, the area occupied by the keyboard 14 can be increased, and the size of the operation keys 15 provided on the keyboard 14 can be increased. Therefore, the operation keys 15 can be used more easily.

Since the cursor keys 17 are arranged around the circumference of the pointing device 16, they can be positioned corresponding to the directions in which the cursor is moved. That is, the cursor keys 17 for vertically moving the cursor can be arranged in front and in the rear of the pointing device 16, and the cursor keys 17 for horizontally moving the cursor can be arranged on the right and left sides of the pointing device 16.

By thus positioning the cursor keys 17 corresponding to the moving directions of the cursor, operation error can be avoided, and ease of operation can be enhanced.

Furthermore, since the pointing device 16 and the cursor keys 17 are provided at the rear right end of the upper surface 3a of the main unit 3, when the information processing apparatus 1 is used as a portable apparatus, the operator can operate the pointing device 16 and the cursor keys 18 with the right hand that is gripping the main unit 3. This can increase usability.

While the switch button 18 and the common button 19 are disposed outside the cursor keys 17, an enter button 29 also may be provided outside the cursor keys 17, as shown in FIGS. 1, 4, 5, and 6.

The enter button 29 is frequently used, for example, to confirm and carry out the item chosen by the pointing device 16 and the cursor keys 17. Therefore, ease of operation and usability can be further increased by placing the enter button 29 outside the cursor keys 17.

By operating the common button 19 for auxiliary entry, an auxiliary entry software program can be started. The auxiliary entry software program has a conversion-candidate supposing function for supposing conversion candidates based on an input character, and for displaying the conversion candidates on the display 5.

A description will be given of an example of an auxiliary entry operation using an auxiliary entry software program, with reference to FIGS. 7 to 15.

Figure 7:
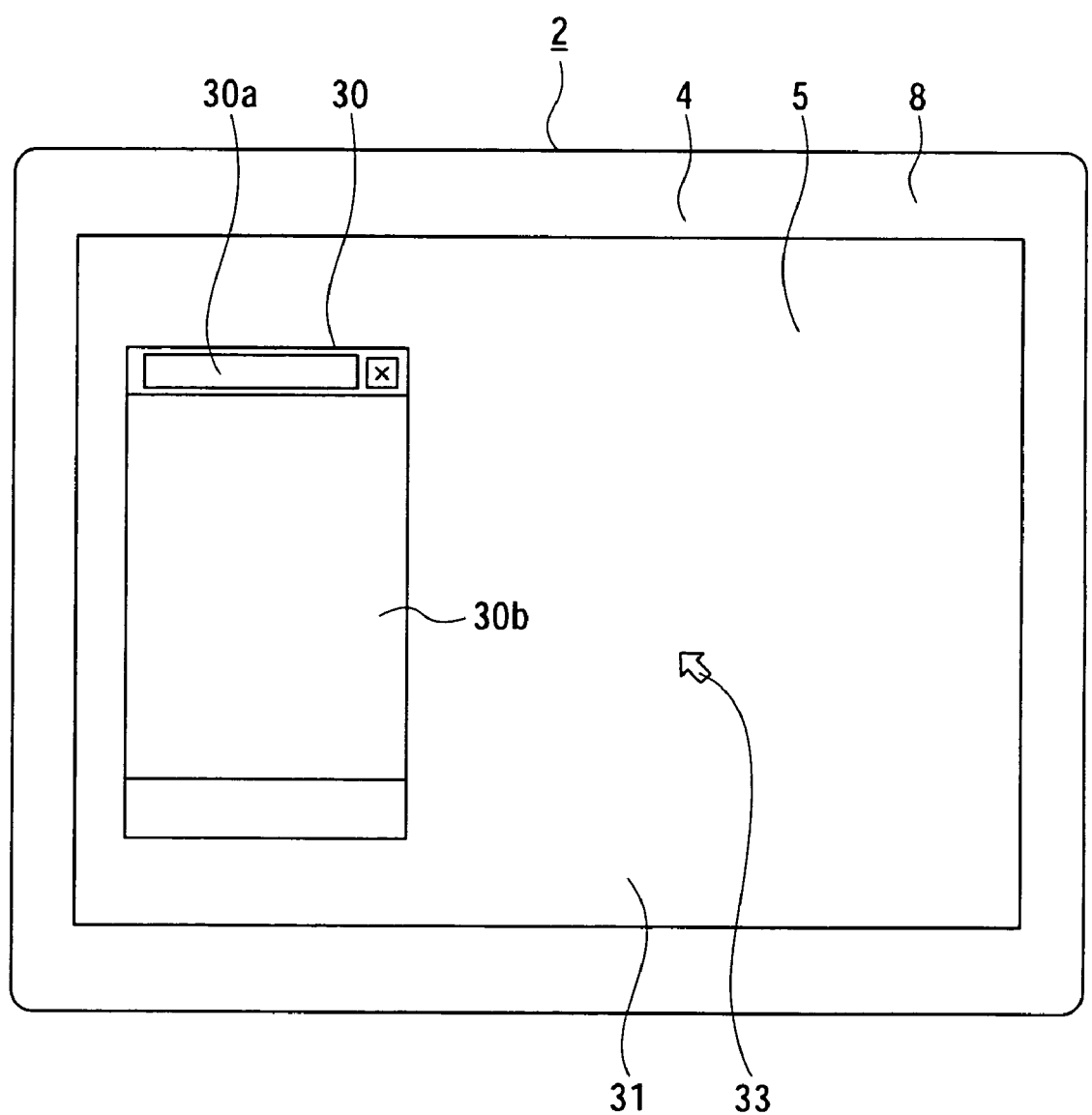
FIG. 7 is an explanatory view showing a state in which an auxiliary entry software program is started and an entry screen is displayed in a procedure for performing an auxiliary entry operation.

By depressing the common button 17, an auxiliary entry software program is started, and an entry screen 30 is displayed on the display 5, as shown in FIG. 7. The entry screen 30 includes an entry-character display unit 30a and a conversion-candidate display unit 30b.

Figure 8:
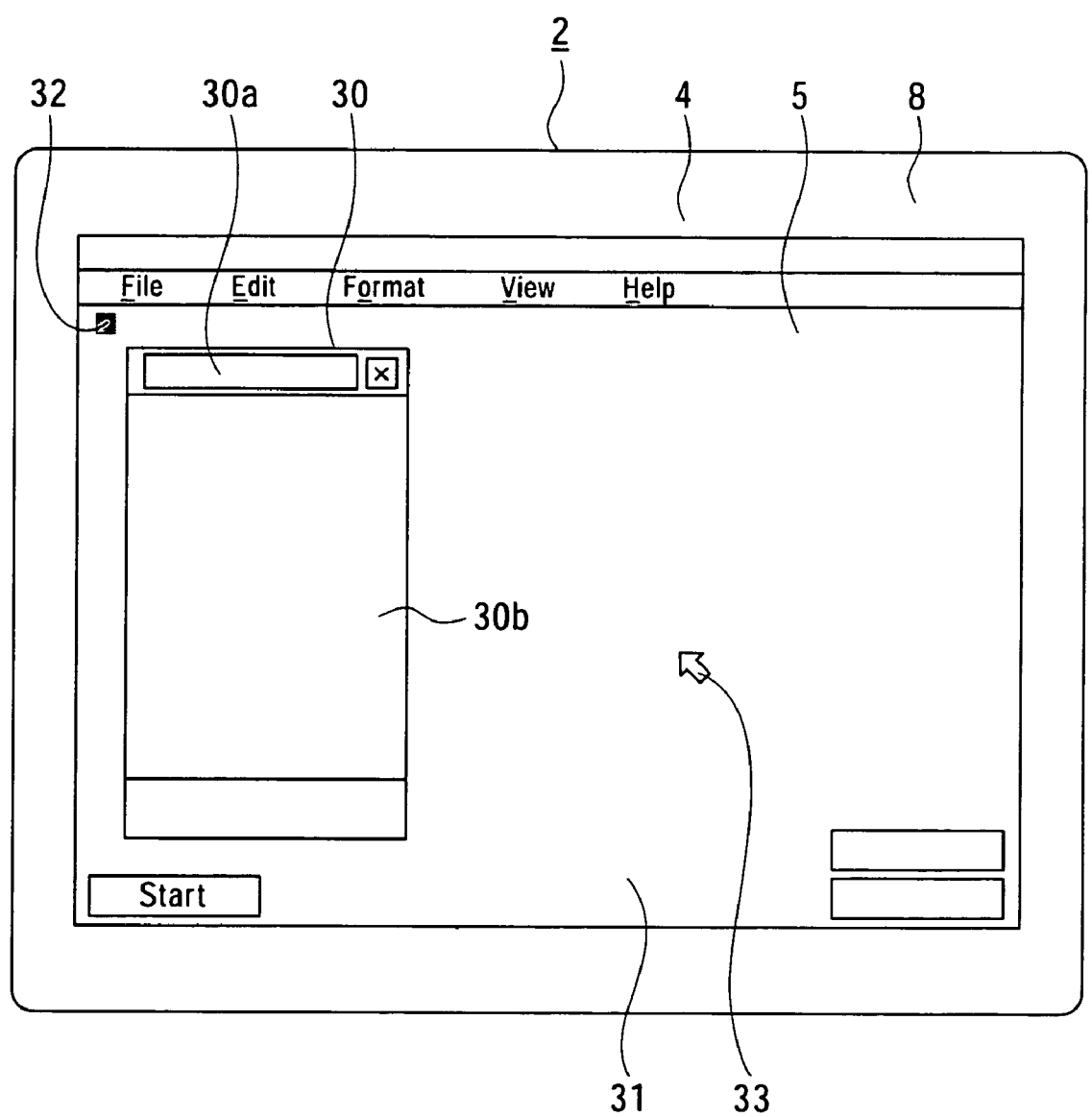
FIG. 8 is an explanatory view showing a state in which a character entry software program is started and a character entry screen is displayed in the procedure.

Subsequently, a desired software program for a word processor or the like is started, and a cursor 32 is moved to a desired entry position on a character entry screen 31 in the software program, as shown in FIG. 8. The cursor 32 is positioned by moving a pointer 33 with the cursor keys 17 or the pointing device 16.

Figure 9:
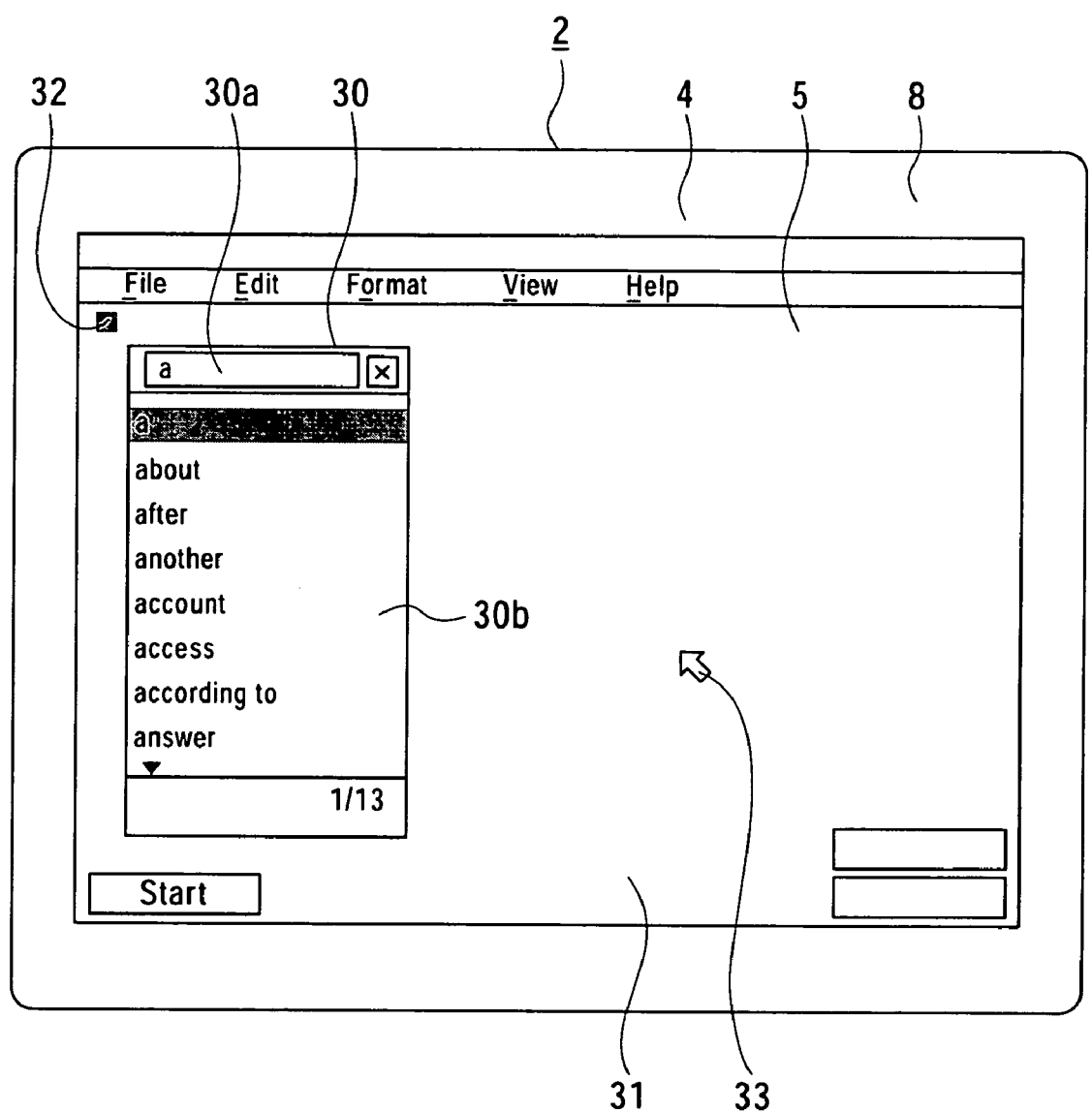
FIG. 9 is an explanatory view showing a state in which a character entered by operating an auxiliary entry key, and conversion candidates are displayed on the entry screen, subsequent to the state shown in FIG. 8.

For example, in order to enter "agenda for today", an auxiliary entry key 15a for ABC is first pressed four times. Thereby, a character "a" is displayed in the entry-character display unit 30a, and a plurality of conversion candidates starting with "a" are displayed in the conversion-candidate display unit 30b, as shown in FIG. 9.

Figure 10:
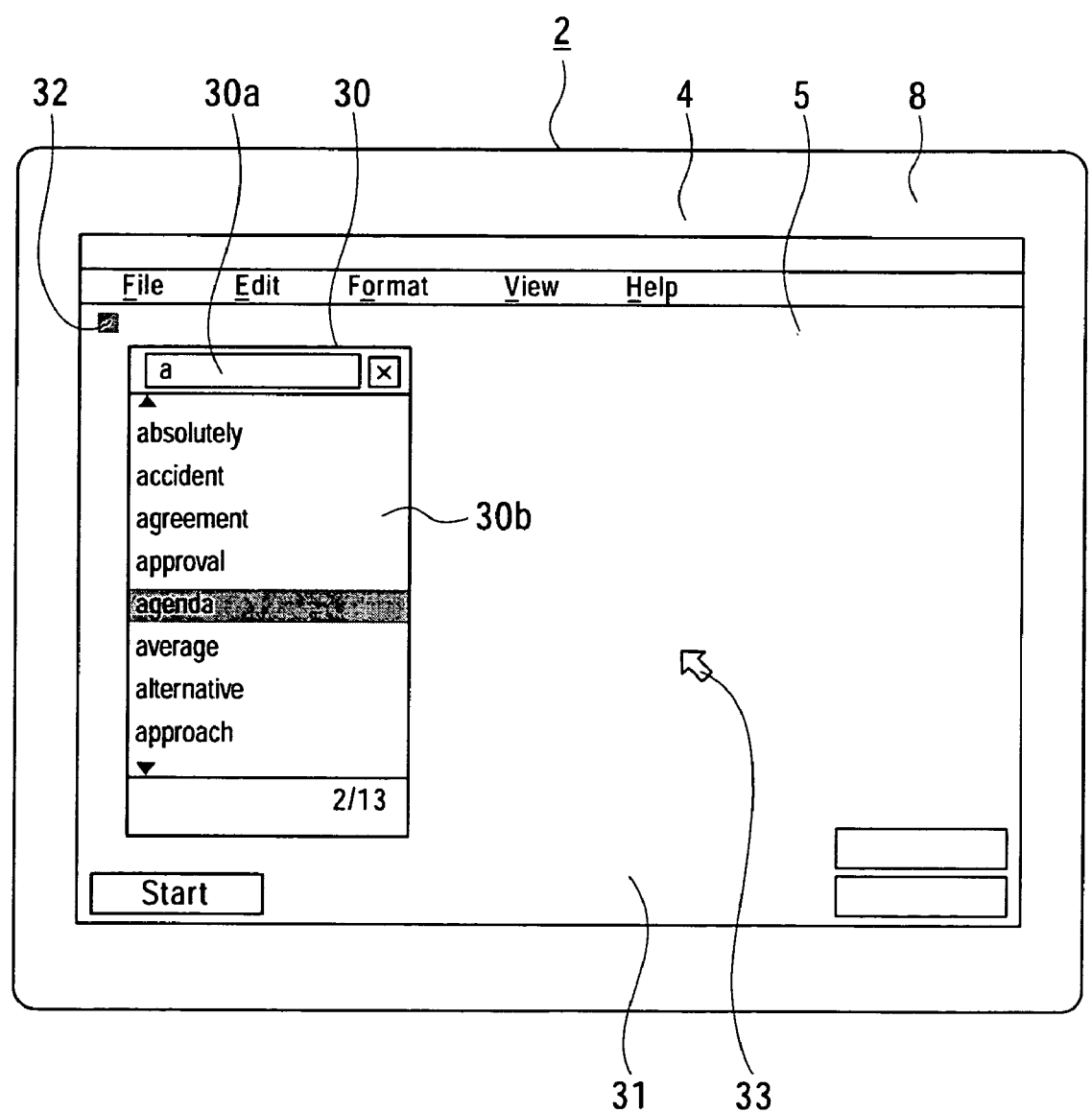
FIG. 10 is an explanatory view showing a state in which a desired one of the conversion candidates is chosen, subsequent to the state shown in FIG. 9.

Next, "agenda" or "agenda for" is searched for and chosen from the conversion candidates displayed in the conversion-candidate display unit 30b. Searching is performed by repeatedly pressing a down cursor key 17 until "agenda" or "agenda for" is displayed in the conversion-candidate display unit 30b, as shown in FIG. 10.

Figure 11:
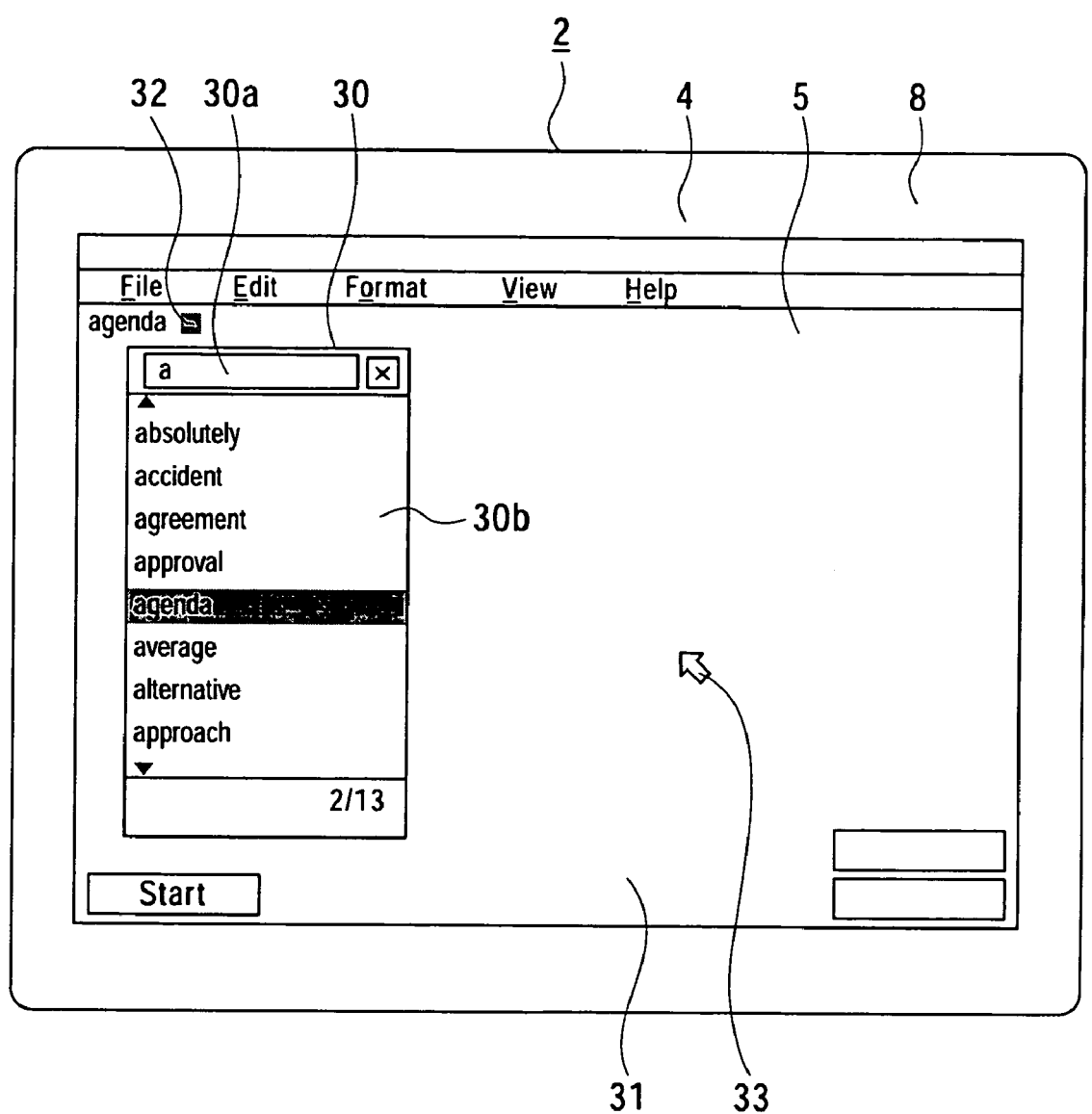
FIG. 11 is an explanatory view showing a state in which the chosen conversion candidate is entered in the character entry screen, subsequent to the state shown in FIG. 10;.

For example, when "agenda" is displayed in the conversion-candidate display unit 30b, the common button 19 is depressed to confirm the entry of "agenda". When the entry is confirmed, "agenda" is entered at the cursor 32 on the character entry screen 31 in the entry software program, as shown in FIG. 11.

Figure 12:
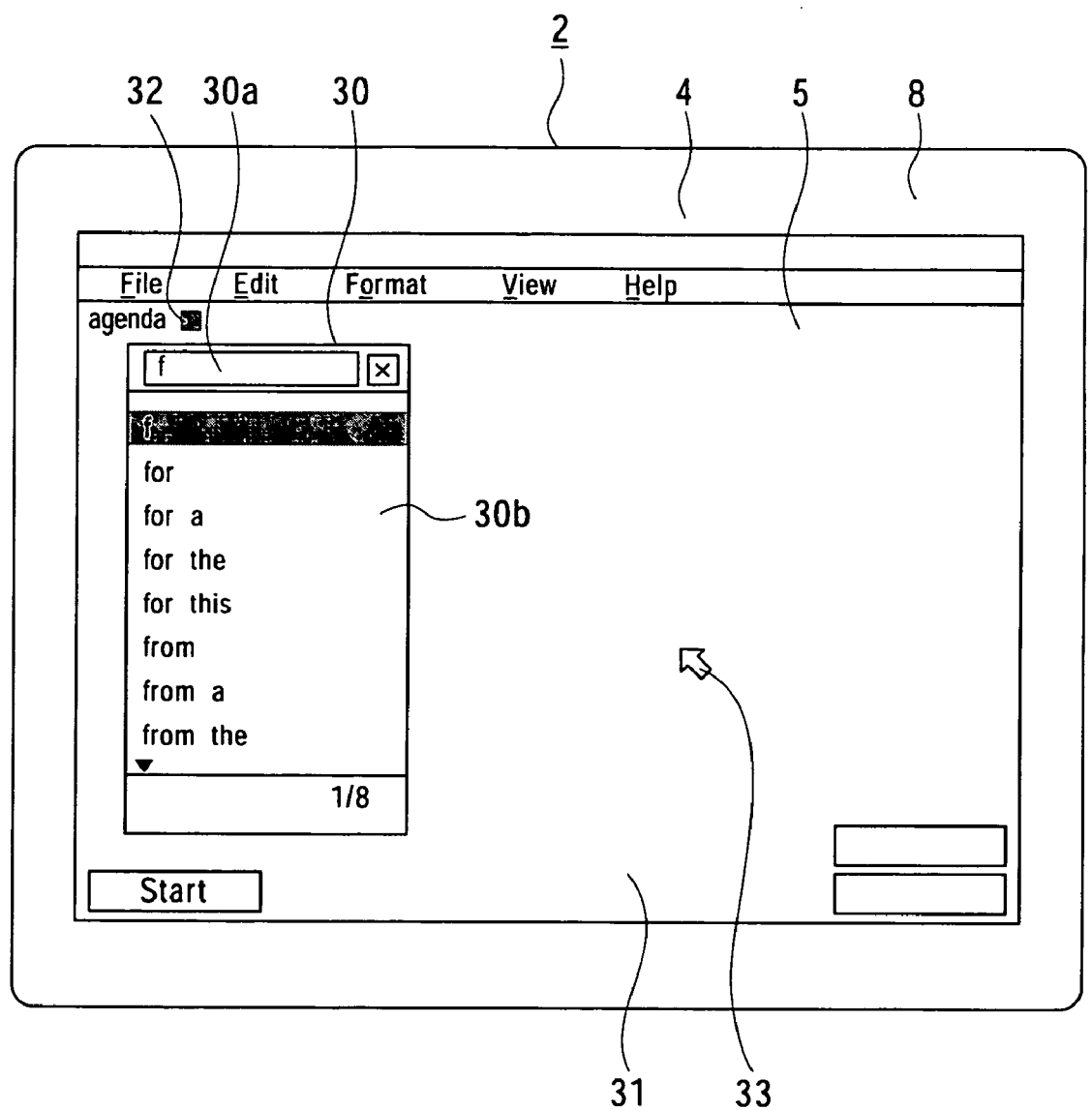
FIG. 12 is an explanatory view showing a state in which a character entered by operating an auxiliary entry key, and conversion candidates are displayed on the input screen, subsequent to the state shown in FIG. 11.

Then, an auxiliary entry key 15a for DEF is pressed six times. Thereby, "f" is displayed in the entry-character display unit 30a, and a plurality of conversion candidates starting with "f" are displayed in the conversion-candidate display unit 30b, as shown in FIG. 12.

Next, "for" is searched for and chosen from the displayed conversion candidates by using the down cursor key 17.

Figure 13:
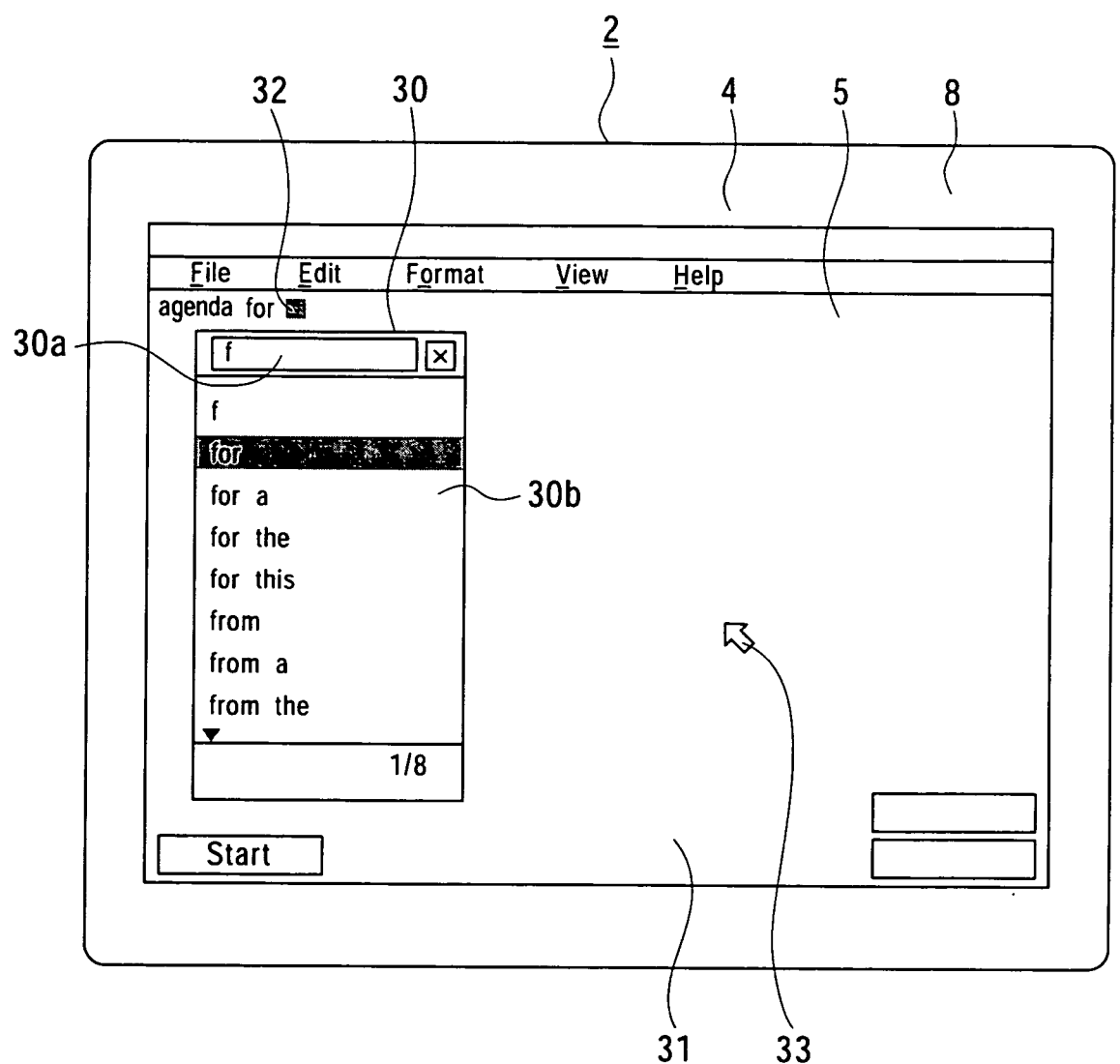
FIG. 13 is an explanatory view showing a state in which a chosen conversion candidate is entered in the character input screen, subsequent to the state shown in FIG. 12.

The common button 19 is pressed to confirm the entry of "for". When the entry is confirmed, "for" is entered at the cursor 32, and "agenda for" is entered on the character entry screen 31, as shown in FIG. 13.

Figure 14:
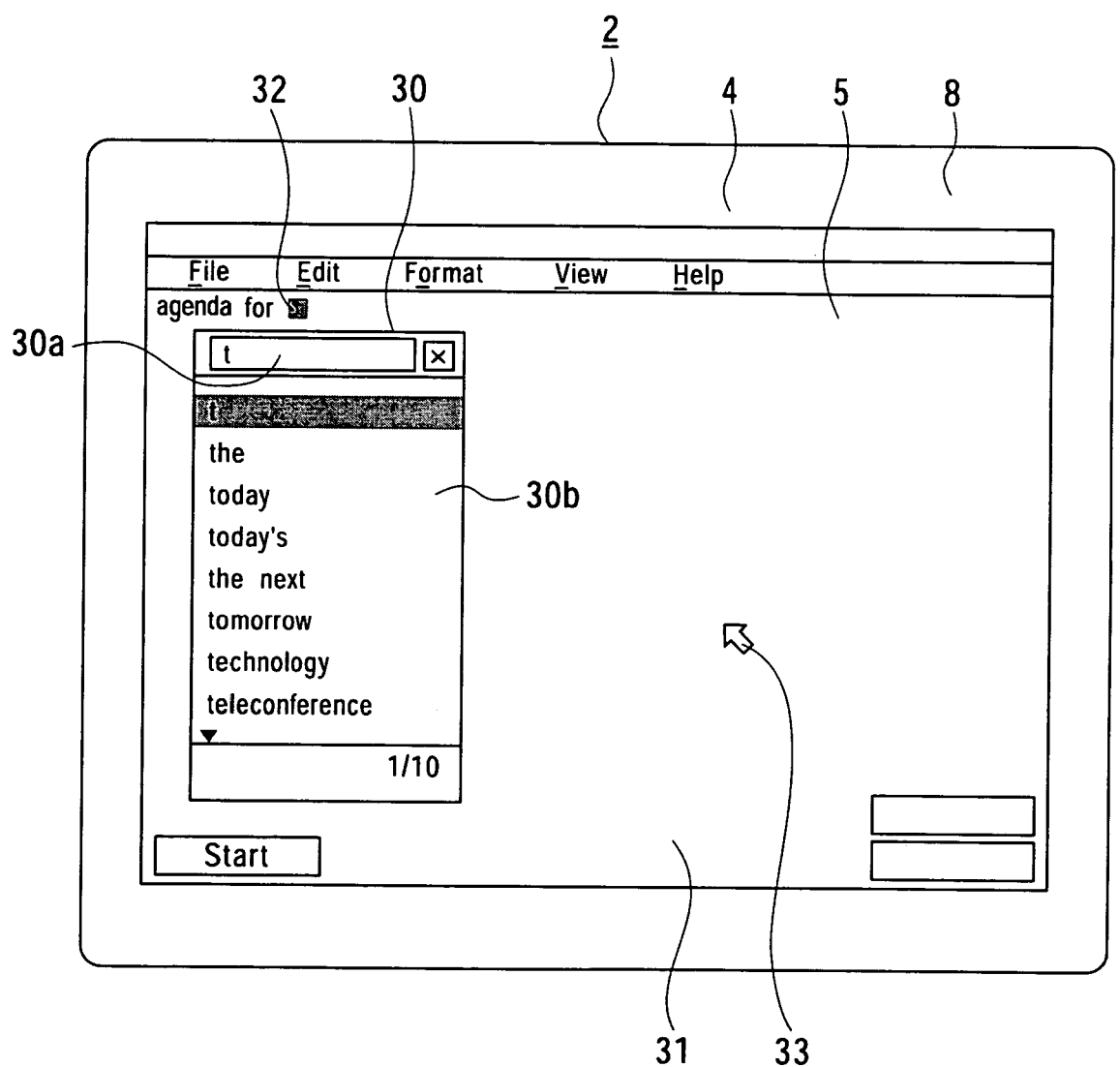
FIG. 14 is an explanatory view showing a state in which a character entered by operating an auxiliary entry key, and conversion candidates are displayed on the input screen, subsequent to the state shown in FIG. 13.

By pressing an auxiliary entry key 15a for TUW four times, "t" is displayed in the entry-character display unit 30a, and a plurality of conversion candidates starting with "t" are displayed in the conversion-candidate display unit 30b, as shown in FIG. 14.

Figure 15:
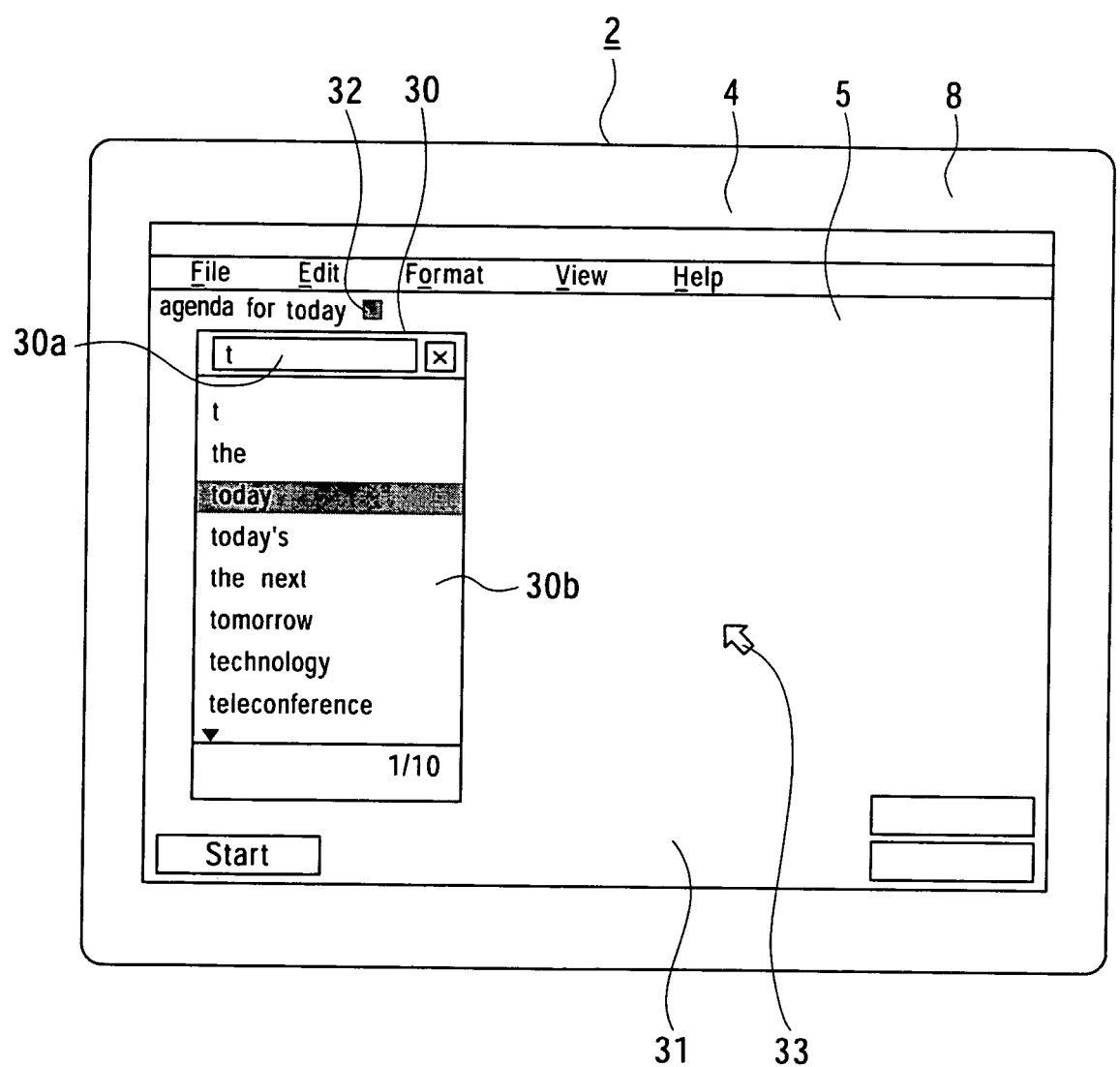
FIG. 15 is an explanatory view showing a state in which a chosen conversion candidate is entered in the character input screen, subsequent to the state shown in FIG. 14.

Then, "today" is searched for and chosen from the displayed conversion candidates. Searching is performed by repeatedly pressing the down cursor key 17 until the "today" is displayed in the conversion-candidate display unit 30b, as shown in FIG. 15.

When "today" is displayed, the common button 19 is pressed to confirm the entry of "today". When the entry is confirmed, "today" is entered at the cursor 32, and finally, "agenda for today" is entered on the character entry screen 31, as shown in FIG. 15.

The auxiliary entry operation is completed when "agenda for today" is entered on the character entry screen 31, as described above.

According to the above, the information processing apparatus 1 has the common button 19 for starting the auxiliary entry software program and for confirming the item chosen with the cursor keys 17. Therefore, different operations in the auxiliary entry software program can be performed with the single button, the number of buttons can be reduced without reducing the performance, and ease of operation can be enhanced.

Since the cursor keys 17 for choosing items and the common button 19 adjoin each other, different operations in the auxiliary entry software program can be performed without moving the hand, and ease of operation is enhanced.

In particular, in a case in which the information processing apparatus 1 is used as a portable apparatus, as shown in FIGS. 5 and 6, the operator can operate the common button 19 and the cursor keys 17 while gripping the main unit 3 with both hands. This increases usability.

Since the pointing device 16 and the common button 19 to be operated when using the auxiliary entry software program adjoin each other, ease of operation and usability can be enhanced further.

In addition, since the cursor keys 17 are arranged around the pointing device 16 and the common button 19 is disposed outside the cursor keys 17, the layout space in the main unit 3 is effectively used, and the size of the information processing apparatus 1 can be reduced.

By clicking the left button 20 once, for example, a software program or a menu item designated by the pointer can be chosen. By double-clicking the left button 20, a software program or a menu item designated by the pointer can be started (carried out). The above operations performed by clicking the left button 20 may be performed by clicking the pointing device 16 once or twice.

By depressing the right button 21, a submenu (popup menu) containing various items can be displayed at the cursor. Items can be chosen from the submenu by operating the pointing device 16 or the cursor keys 17. The chosen item can be carried out by operating the left button 20, the pointing device 16, the Enter key on the keyboard 14, or the enter button 29.

By applying a force in a required direction to the pointing device 16 in a state in which the pointer is aligned with a desired item, for example, an icon displayed on the display 5, and the left button 20 is depressed, the item at the pointer can be moved to a desired position on the display 5.

By applying a force in a predetermined direction to the pointing device 16 while pressing the center button 22, the display screen can be scrolled in the predetermined direction. For example, the display screen can be horizontally scrolled by operating the pointing device 16 in the horizontal direction while pressing the center button 22, and can be vertically scrolled by operating the pointing device 16 in the vertical direction.

By vertically operating the pointing device 16 without separating the finger therefrom after horizontally operating the pointing device 16 while pressing the center button 22, vertical scrolling can be performed after horizontal scrolling. By horizontally operating the pointing device 16 without separating the finger therefrom after vertically operating the pointing device 16, horizontal scrolling can be performed after vertical scrolling.

While the display screen is scrolled by operating the pointing device 16 while pressing the center button 22 in the above description, for example, it may be scrolled by operating the center button 22 in a required direction with the finger without using the pointing device 16.

Since the left button 20, the right button 21, and the center button 22 are provided at the left rear end of the upper surface 3a of the main unit 3, as described above, they can be operated with the left hand that is gripping the main unit 3 when the information processing apparatus 1 is used as a portable apparatus. This enhances usability of the portable apparatus.

In particular, since the left button 20, the right button 21, and the center button 22 are frequently used, and are often used in succession, when they are disposed adjacent to each other, different operations can be performed without moving the hand, and ease of operation is enhanced.

Since the left button 20 and the right button 21 are disposed around the center button 22, the layout space of the main unit 3 is effectively used, and the size of the information processing apparatus 1 can be reduced.

Furthermore, the pointing device 16 and the cursor keys 17 that are frequently used are provided at the end of the main unit 3 remote from the left button 20, the right button 21, and the center button 22. Therefore, when the information processing apparatus 1 is used as a portable apparatus, the left button 20, the right button 21, and the center button 22 can be operated with the left hand that is gripping the main unit 3, as shown in FIG. 5. Moreover, the pointing device 16 and the cursor keys 17 can be operated with the right hand that is also gripping the main unit 3. Consequently, usability is enhanced.

While the screen can be scrolled by operating the center button 22 in the above description, for example, the center button 22 may also serve the functions of the left button 20 and the right button 21.

The cursor may be moved page by page to the next page or to the previous page by operating the cursor keys 17 while depressing the center button 22.

While the pointing device 16, the cursor keys 17, the switch button 18, the common button 19, and the enter button 29 are provided at the right end of the main unit 3 and the left button 20, the right button 21, and the center button 22 are provided at the left end in the above description, conversely, the left button 20, the right button 21, and the center button 22 may be provided at the right end of the main unit 3, and the pointing device 16, the cursor keys 17, the switch button 18, the common button 19, and the enter button 29 may be provided at the left end.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
a display;
a keyboard having a plurality of operation keys;
a pointing device configured to control a pointer appearing on the display, said pointing device is positioned between said display and said keyboard; and
a first function button and a second function button that control an object chosen by said pointer appearing on the display, and a third function button that allows a screen displayed on the display to be scrolled are all positioned between said display and said keyboard;
wherein said pointing device is positioned on an opposite side of the apparatus to said first function button, said second function button and said third function button.

2. The information processing apparatus according to claim 1, wherein said first function button and said second function button are arranged around a circumference of said third function button.

3. An information processing apparatus according to claim 1, further comprising:
a plurality of cursor keys for moving a cursor appearing on said display in predetermined directions, said cursor keys being arranged around a circumference of said pointing device.

4. An information processing apparatus according to claim 1, wherein said screen is scrolled when said third function button is pressed and held, and force is then applied on said pointing device in a predetermined direction.

5. A method for controlling an information processing apparatus comprising steps of:
Inputting data via a keyboard having a plurality of operation keys and displaying a representation of said data on a display;
controlling with a pointing device a pointer appearing on the display, said pointing device being positioned between said display and said keyboard;
controlling an object chosen by said pointer appearing on the display, by actuating a first function button and a second function button both positioned between said display and said keyboard;
scrolling the representation of said data displayed on the display by actuation of a third function button positioned between said display and said keyboard,
wherein said pointing device is positioned on an opposite side of said information processing apparatus to said first function button, said second function button and said third function button.

* * * * *